United States Patent
Fessler-Knobel

(10) Patent No.: US 8,341,841 B2
(45) Date of Patent: Jan. 1, 2013

(54) METHOD FOR MACHINING COMPONENTS OF A GAS TURBINE AND COMPOSITE MATERIAL

(75) Inventor: Martin Fessler-Knobel, Munich (DE)

(73) Assignee: MTU Aero Engines GmbH, Munich (DE)

( * ) Notice: Subject to any disclaimer, the term of this patent is extended or adjusted under 35 U.S.C. 154(b) by 1210 days.

(21) Appl. No.: 12/150,985

(22) Filed: May 2, 2008

(65) Prior Publication Data

US 2009/0025220 A1    Jan. 29, 2009

(30) Foreign Application Priority Data

May 4, 2007  (DE) .......................... 10 2007 020 957

(51) Int. Cl.
*B21D 53/78*   (2006.01)
(52) U.S. Cl. ........ 29/889.7; 29/889; 29/889.1; 29/281.1
(58) Field of Classification Search .................... 29/889, 29/889.1, 889.2–889.722, 281.1–281.4
See application file for complete search history.

(56) References Cited

U.S. PATENT DOCUMENTS 3,818,646 A * 6/1974 Peterson ....................... 451/365

* cited by examiner

*Primary Examiner* — Richard Chang
(74) *Attorney, Agent, or Firm* — Davidson, Davidson & Kappel, LLC

(57) ABSTRACT

A method for machining components of a gas turbine, in particular for machining turbine blades, is described. The method includes the following steps: a) providing at least one component carrier having at least one component receptacle for detachable accommodation and fastening component to be machined, the component receptacle being designed with a contour similar to at least one contour of subarea of component to be accommodated; b) introducing at least one subarea of the component into component receptacle and form-fitting and/or substance-to-substance bonding of the subarea of the component to component receptacle; c) machining the component, which is attached to the component carrier; and d) releasing the machined component from the component carrier. In addition, a device for machining turbine blades is described having at least one component carrier, the component carrier having at least one component receptacle for detachable accommodation and fastening of the component that is to be machined, and the component receptacle being designed with a contour resembling at least one contour of a subarea of the component that is to be accommodated, as well as a composite material for machining or bonding components of a gas turbine, in particular for machining turbine blades, the composite material including a woven or non-woven fiber material and an adhesive, an adhesive support or individual adhesive components, such that the adhesive, the adhesive support or the adhesive components of the fiber material at least partially surrounds the fiber material. The use of the composite material in methods for machining or bonding components of a gas turbine is also described.

29 Claims, 5 Drawing Sheets

METHOD FOR MACHINING COMPONENTS OF A GAS TURBINE AND COMPOSITE MATERIAL

This application claims priority to German Patent Application DE 10 2007 020 957.8, filed May 4, 2007, which is incorporated by reference herein.

The present invention relates to a method for machining components of a gas turbine, in particular for machining turbine blades, and a device for machining components of a gas turbine, in particular for machining turbine blades, having at least one component carrier. In addition, the present invention relates to a composite material for machining or joining components of a gas turbine such as an aircraft engine, in particular for machining turbine blades or compressor blades, and a method for using a composite material in methods for machining or joining components of a gas turbine.

BACKGROUND

For joining components of a gas turbine, welding methods that ensure a sufficiently high joining strength between the parts to be joined are generally used. However, such methods are expensive and time-consuming. It has therefore also been proposed that adhesive joints may be used to produce parts of a gas turbine. However, the disadvantage of such adhesive joints is that the adhesive bond has a greatly reduced strength when there are large adhesive gaps and thus they often cannot be used in particular with parts of a gas turbine that are exposed to high thermal and mechanical stresses.

In machining parts of a gas turbine, in particular in machining turbine blades, abrasive machining is used as one of the most important methods. Grinding here is performed in the form of shaping machining, the highest demands being made of the surface and the dimensional accuracy. Machining of turbine blades may include surface grinding, recess grinding, profile grinding and curve grinding. Depending on the type of blade, up to twelve different operations may be necessary per blade. So-called chucking devices have so far been used to stabilize the component, in particular the turbine blade. However, such stabilization of the parts to be machined entails the risk that the component might be damaged in so-called hard chucking and that its position is altered in fixed chucking. For abrasive machining of turbine blades, up to five different machines are used per machining sequence, so that the components to be machined must be rechucked several times. This procedure is difficult to automate, so that only relatively low production rates are achievable. Moreover, a high retooling complexity is required in changing components. Furthermore, according to the related art, turbine blades are cast in a low-melting metal alloy and then are chucked on a component carrier. Disadvantages here include a high process unreliability, poor reproducibility and dimensional stability as well as high process costs. Furthermore, complex cleaning of turbine blades is necessary to remove metal residues.

SUMMARY OF THE INVENTION

An object of the present invention is therefore to provide a generic method for machining components of a gas turbine, in particular for machining turbine blades, which will minimize the possibility of damage to the components, may be implemented inexpensively, ensures a high machining accuracy and high production rates. Another object of the present invention is to provide a generic composite material and applications of the composite material which will minimize the possibility of damage to the components, is inexpensively implementable, ensures high machining accuracy, and ensures joining strength in a possible equalization of tolerance between the joining surfaces and even with large adhesive gaps.

Another object of the present invention is to provide a generic device for machining components of a gas turbine, in particular for machining turbine blades, having at least one component carrier which minimizes the possibility of damage to components while also ensuring high machining rates and high production rates.

A method according to the present invention for machining components of a gas turbine, in particular for machining turbine blades, includes the following steps: a) providing at least one component carrier having at least one component receptacle for detachable reception and fastening of the component to be machined, the component receptacle being designed to have a contour similar to at least one contour of one subarea of the component to be accommodated; b) introducing the at least one subarea of the component into the component receptacle, and form-fitting and/or substance-to-substance joining of the subarea of the component to the component receptacle; c) machining the component joined to the component carrier and d) releasing the machined component from the component carrier. According to the present invention, the components to be machined are held on the component carrier by a form-fitting and/or substance-to-substance joint. The component to be machined remains fixedly connected to the component carrier during all the machining and/or manufacturing steps. It is thus advantageously possible for a single component carrier to be used for the entire component machining operation, in particular of the turbine blades. The component may be guided through several working stations in a simple manner. The method according to the present invention allows a very high degree of automation and thus contributes toward high production rates. Furthermore, high machining accuracy is obtained because repeated rechucking of the components to be machined is omitted. Furthermore, the possibility of damage to the component to be machined is minimized because chucking of the component, as is performed in the known methods, is no longer necessary. In addition, a transfer of high machining forces is advantageously also possible. On the whole, the automatability of the individual method steps and the associated shorter machining times of the component to be machined result in an inexpensive method for machining components of a gas turbine.

In an advantageous embodiment of the method according to the present invention, the substance-to-substance joining according to method step b) is performed by adhesive bonding of the subarea to the component receptacle. In addition to the advantage of a secure connection, the adhesive may also function as a filler for equalizing component tolerances at the bonded sites. This also contributes toward an increase in machining accuracy and the associated fewer rejects of components. The component to be machined is held by adhesion during machining and also by a form-fitting bond, depending on the introduction of force during machining.

According to another advantageous embodiment of the method according to the present invention, the form-fitting connection according to method step b) may be accomplished by previous sheathing by recasting or extrusion coating of at least the areas of the subareas which are accommodated in the component receptacle and insertion of this subarea of the component into the component receptacle. This form-fitting connection may be used alternatively or to supplement the substance-to-substance joining by adhesive bonding. A metal alloy, a thermoplastic and/or a hot-melt adhesive composition may be used as the material for sheathing by recasting or extrusion coating. The sheathing by recasting or extrusion coating may be performed in an injection molding machine.

In another advantageous embodiment of the method according to the present invention, the machined component is released from the component carrier according to method step d) by chemical, thermal or mechanical means. The type of releasing method is determined by the selected material for the connection of the component and/or the subarea of the component to the component receptacle. Remaining residues of material, such as adhesive residues, are removed by a suitable cleaning method in conclusion.

In another advantageous embodiment of the method according to the present invention, before machining the component connected to the component carrier according to method step c), the exact location and position of the component within and/or relative to the component carrier is determined. The location and position may be determined by visual and/or tactile and/or ultrasound methods. By determining the location and position of the component relative to the component carrier and corresponding consideration of these factors in machining, machining inaccuracies may additionally be eliminated. The location and position information may be stored in a component-specific manner, so that each component carrier is individually positionable in a corresponding working station and/or machine tool.

In another advantageous embodiment of the method according to the present invention, the component carrier has as at least one identification device. Through advantageous and consistent use of a component carrier per component to be machined, component- and manufacturing-specific information may be made available during the entire manufacturing operation. Components may be identified automatically, e.g., via so-called radio frequency identification (RFID). To this end, the identification device includes at least one RFID tag. Other identification devices are also conceivable. For example, a barcode label may also be used as an identification device, such that its information may be read out via a corresponding scanning device.

In another advantageous embodiment of the method according to the present invention, the machining of the component joined to the component carrier performed in method step c) includes multiple machining steps at multiple machining stations. The machining steps may include grinding and/or deburring and/or coating of at least one subarea of the component. Other machining methods are also conceivable. Since only one component carrier is always needed here, this advantageously results in a higher process reliability due to a lower number of method steps and high production rates in particular.

A device according to the present invention for machining components of a gas turbine, in particular for machining turbine blades, has at least one component carrier. According to the present invention, this component carrier has at least one component receptacle for detachable accommodation and fastening of the component to be machined, the component receptacle being designed with a contour resembling at least one contour of a subarea of the component to be accommodated. The contour of the component receptacle in particular is shaped so that the corresponding contour of the partial area of the component to be accommodated may be joined by form-fitting and/or substance-to-substance joining. Such a device ensures high machining accuracy and high production rates and also yields fewer rejects than in machining of the corresponding components. This is achieved through the advantageous continuous use of a single component carrier within the device for machining the corresponding component, in particular for machining a turbine blade. In addition, this yields a high automatability of the device and a higher method reliability owing to a lower number of method steps which are to be executed using the device according to the present invention. This is also less expensive because the component carrier is reusable. Due to the form-fitting and/or substance-to-substance joining of the component to be machined within the component carrier, this yields a fixed connection which also allows the transmission of high machining forces. The component to be machined is held during machining by adhesive as well as by the form-fitting connection, depending on the introduction of forces during the machining. For the form-fitting and/or substance-to-substance joining, the component to be machined is glued to the component receptacle of the component carrier in the area of the subarea. Alternatively and/or additionally, this connection may be accomplished through a form-fitting connection by thermoplastic, a hot-melt adhesive composition or a metal alloy with which at least the subarea of the component is sheathed.

In another advantageous embodiment of the device according to the present invention, it has a location and position monitoring device for determining the accurate location and position of the component within and/or relative to the component carrier. The location and position monitoring device may be a visual, tactile and/or ultrasonic measurement device. This provides a high level of process and/or machining accuracy through the device according to the present invention because each component carrier may be positioned individually within the device and/or within the machining stations for the component to be machined.

In another advantageous embodiment of the device according to the present invention, the component carrier has at least one identification device. This allows automatic identification of the corresponding component, so that component-specific and manufacturing-specific information may be made available during the entire manufacturing operation. The identification device may include at least one RFID tag, but other identification devices are also conceivable.

The composite material according to the present invention for machining or joining components of a gas turbine, in particular for machining turbine blades, is made of a woven or nonwoven fiber material and an adhesive, an adhesive support, or individual adhesive components; the adhesive, the adhesive support or the adhesive components at least partially surrounding the fiber material. Due to the composite material according to the present invention, an increase in the adhesive strength is ensured because, first of all, in addition to the joining surfaces of the components to be joined together, additional active surface area of the fiber material is made available to the adhesive, the adhesive support or the individual adhesive components. Furthermore, an equalization of tolerance between the components to be joined and/or joining surfaces of the components to be joined is possible through the fiber material, which may be designed, e.g., as a woven mat, a nonwoven or a braided material. Furthermore, due to the use of the composite material according to the present invention, this yields a cost reduction because a chucking operation, including the chucking means in the manufacture of the components of the gas turbine, e.g., a turbine blade, may be simplified. Furthermore, the curing time of the adhesive is reduced with the composite material according to the present invention due to the definite increase in the active surface area. A low-damage or damage-free release of a joint produced by the composite material according to the present invention may possibly be accomplished.

According to other advantageous embodiments of the composite material according to the present invention, it is designed in ribbons or strips. This facilitates the processability of the composite material because it may be made available as a type of adhesive tape.

In other advantageous embodiments of the composite material according to the present invention, the fiber material is made of metal, a metal alloy, steel, plastic, paper, cotton wadding or a mixture thereof.

In another advantageous embodiment of the composite material according to the present invention, it is designed so that the adhesive support releases the adhesive on compression of the fiber material. This prevents premature bonding of the components to one another.

In another advantageous embodiment of the composite material according to the present invention, it is designed in such a way that the adhesive components are released on compression of the fiber material and manifest an adhesive effect. This embodiment of the composite material also prevents premature bonding of the adhesive material to the components of the gas turbine that are to be joined.

Use of the composite material according to the present invention in a method for machining components of a gas turbine, in particular for machining turbine blades, includes the following steps: a) providing at least one component carrier having at least one component receptacle for detachable reception and fastening of the component to be machined, the component receptacle being designed to have a contour similar to at least one contour of a subarea of the component to be accommodated; b) applying the composite material to the component receptacle and introducing the at least one subarea of the component into the component receptacle and form-fitting and/or substance-to-substance joining of the subarea of the component to the component receptacle; c) machining the component joined to the component carrier and d) releasing the machined component from the component carrier. According to the present invention, the components to be machined are held securely on the component carrier by a form-fitting and/or substance-to-substance joining by the composite material. In addition to the advantage of a secure connection, the composite material may also function as a filler for equalizing component tolerances and large adhesive gaps on the locations joined. This also contributes toward an increase in machining accuracy and fewer rejects of components associated with that. The component to be machined remains fixedly attached to the component carrier during all the machining and/or manufacturing steps. It is therefore advantageously possible for a single component carrier to be used for the entire machining operation of the component, in particular for the turbine blades. The component may be guided through multiple operating stations in a simple manner. The use of the component material according to the present invention allows a very high degree of automation and thus contributes toward high production rates. Furthermore, high machining accuracy is obtained because repeated rechucking of the components to be machined is eliminated. Furthermore, the possibility of damage to the component to be machined is minimized because chucking of the components as is performed with the known method is no longer necessary. In addition, a transfer of high machining forces is also possible. On the whole, due to the automatability of the individual method steps and the associated shorter machining times of the component to be machined, this yields an inexpensive method for machining components of a gas turbine.

According to another advantageous embodiment of the use according to the present invention, the form-fitting connection may be accomplished according to method step b) by prior sheathing by recasting or extrusion coating of at least the areas of the subarea which are accommodated in the component receptacle and insertion of this subarea of the component into the component receptacle. This form-fitting connection may be used in addition to the form-fitting connection via the composite material. A metal alloy, a thermoplastic and/or a hot-melt adhesive composition may be used as the material for sheathing by recasting or extrusion coating. Sheathing by recasting or extrusion coating may be performed in an injection molding machine.

In another advantageous embodiment of the use according to the present invention, the composite material is cured or the machined component is released from the component carrier in method steps b) or d) chemically, thermally or mechanically. The type of curing or releasing method is determined by the selected material for the composite material.

In another advantageous embodiment of the use according to the present invention, according to method step c) the exact location and position of the component are determined within and/or relative to the component carrier before machining the component connected to the component carrier. The location and position determination may be performed by visual and/or tactile and/or ultrasound methods. By determining the position of the component relative to the component carrier and the corresponding consideration thereof in machining, it is additionally possible to eliminate machining inaccuracies. The location and position information may be stored in a component-specific manner so that each component carrier may be positioned individually in a corresponding working station and/or machining station.

In another advantageous embodiment of the use of the composite material according to the present invention, the machining of the component attached to the component carrier which is performed in method step c) includes multiple machining steps at multiple machining stations. The machining steps may include grinding and/or deburring and/or coating of at least a subarea of the component. Other machining methods are also conceivable. Since only one component carrier is needed here, this advantageously results in an especially high process reliability due to a lower number of method steps and high production rates.

Use of the composite material according to the present invention as described above in a method for joining components of a gas turbine includes the following steps: a) providing a first component of a gas turbine; b) applying the composite material to a joining surface of the first component; c) applying a joining surface of the second component to the joining face of the first component, forming an adhesive gap, which is formed at least partially with the composite material, and d) fully curing the adhesive of the composite material, allowing a form-fitting and/or frictionally engaged adhesive joint between the first and second components of the gas turbine. The use of the composite material according to the present invention allows, on the one hand, an equalization of tolerance between the joining surfaces of the components to be joined but, on the other hand, components that form a large gap between one another in bonding may be joined together with a sufficiently high bonding strength. It is possible here for the fiber material of the composite material to come in contact with the adhesive only in the actual joining operation, e.g., by covering the adhesive site with steel wool as the fiber material and then impregnating it with adhesive. However, it is also possible for an adhesive support to release the adhesive of the fiber material due to compression of the composite material or for the adhesive components to be released on compression of the fiber material and thereby manifest an adhesive effect. According to another advantageous embodiment of the use according to the present invention, the adhesive of the composite material is cured chemically, thermally or mechanically by the influence of pressure in method step d). For example, energy in the form of light or heat may be introduced. By compression of the fiber material according to another exemplary embodiment, chambers filled with adhesive or adhesive components may be destroyed.

In a particularly advantageous embodiment, a composite material according to the present invention is used in the method according to the present invention.

BRIEF DESCRIPTION OF THE DRAWINGS

Additional advantages, features and details of the present invention are derived from the following description of the exemplary embodiments shown in the drawings.

DETAILED DESCRIPTION

Figure 1:
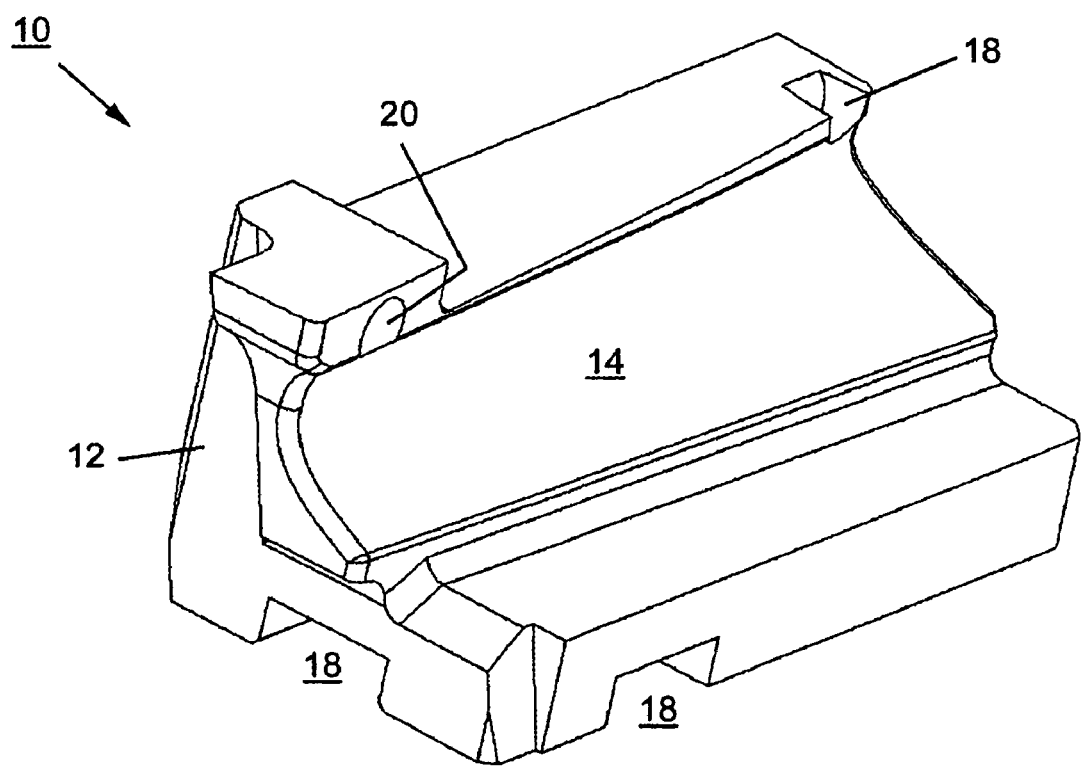
FIG. 1 shows a schematic diagram of a device according to the present invention for machining components of a gas turbine.

FIG. 1 shows a schematic diagram of a device for machining components of a gas turbine. The device includes a component carrier 10. Component carrier 10 is composed of a component body 12 and a component receptacle 14, which is designed in component body 12 and permits detachable accommodation and attachment of a component 16 that is to be machined, namely a turbine blade 16 (see FIG. 2). It may be seen here that component receptacle 14 has a contour like that of a subarea 22 of turbine blades 16 to be accommodated (see also FIG. 2). Component carrier 10 also has multiple recesses 18 in component body 12. Recesses 18 engage a corresponding conveyance device for conveying component carrier 10 to the various machining stations and for positioning and correcting the position of component carrier 10. In addition, an engagement 20, which facilitates the release of turbine blade 16 from component carrier 10, is also provided.

Figure 2:
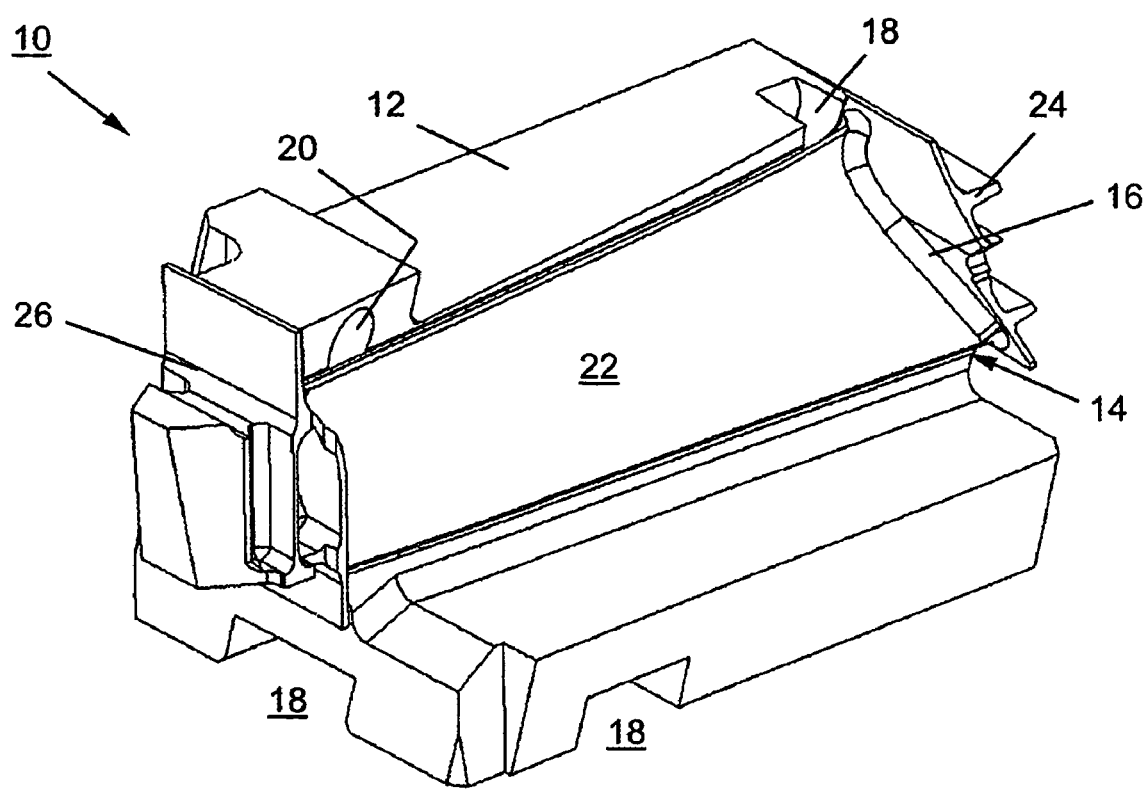
FIG. 2 shows a schematic diagram of the device according to the present invention as shown in FIG. 1, with the component inserted.

FIG. 2 shows a schematic diagram of component carrier 10 of the device having an inserted component 16, namely a turbine blade 16. Turbine blade 16 is a so-called guide vane. It is apparent here that the turbine blade is made of a blade vane or subarea 22 as well as an outer shroud 24 and an inner shroud 26, shrouds 24, 26 being attached to the particular ends of blade vane 22. FIG. 2 shows clearly that blade vane 22 is inserted as the subarea of turbine blade 16 into the contour of component receptacle 14 and enters into a form-fitting and/or substance-to-substance joining thereto. The connection is established according to the exemplary embodiment by adhesive bonding of blade vane 22 to component receptacle 14. The adhesive may then additionally function as a filler for equalizing component tolerances at the bonded sites. Turbine blade 16 is held by adhesion during machining as well as being held by the form-fitting connection, depending on the application of force during machining. The adhesive bond is released mechanically, chemically or thermally after machining turbine blade 16. Adhesive residues are removed by suitable cleaning methods. In addition, it is apparent that a transfer of high forces is possible through the mounting of turbine blade 16 and/or of blade vane 22 in component carrier 10, as shown here, without damaging turbine blade 16 or subareas thereof.

The exemplary embodiment described above makes it clear that the method according to the present invention and component carrier 10 are suitable for production and repair of components of a gas turbine.

Figure 3:
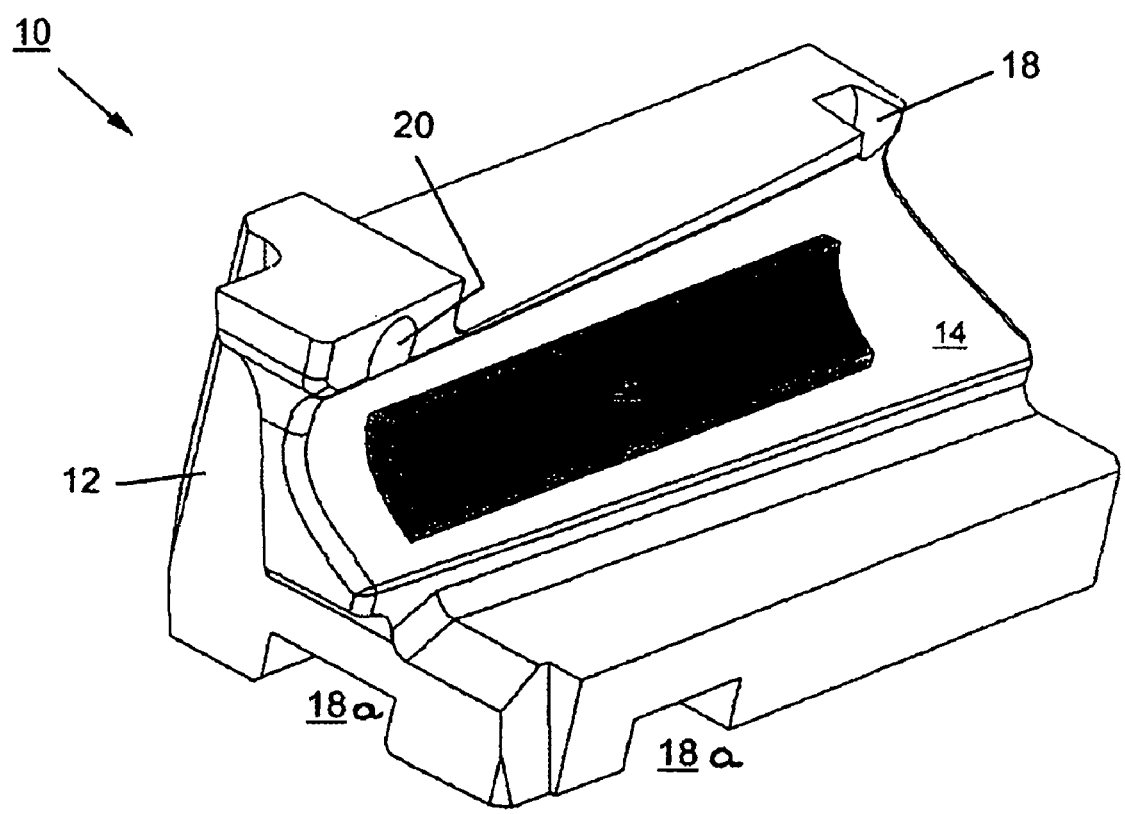
FIG. 3 shows a schematic diagram of a first application of the composite material according to the present invention.

FIG. 3 shows a schematic diagram of a device for machining components of a gas turbine. The device includes a component carrier 10. Component carrier 10 includes a component body 12 and a component receptacle 14 designed in the component body 12 for detachable reception and fastening of a component 16 to be machined, namely a turbine blade 16 (see FIG. 4). It is apparent here that component receptacle 14 is designed with a contour resembling a contour of a subarea 22 of turbine blade 16 to be accommodated (see also FIG. 4). Component carrier 10 also has multiple recesses 18, 18a in component body 12. Recesses 18, are used for an installation system of the blades in joining the blades 16 to component carrier 10. Recesses 18a are provided for and/or as a component of a chucking system used for chucking component carrier 10 (e.g., in measurement and/or machining and/or joining).

It is also possible to see that in a subarea of component receptacle 14, a strip-like composite material 28 has been applied. Composite material 28 is composed of a woven or nonwoven fiber material 30 and an adhesive, an adhesive support or individual adhesive components in such a way that the adhesive, the adhesive support or the adhesive components at least partially surround fiber material 30. Fiber material 30 may be designed as a woven mat, a nonwoven or braided material. In the exemplary embodiment depicted here, fiber material 30 is made of steel wool. Composite material 28 is cured chemically, thermally or mechanically by applying a pressure.

Figure 4:
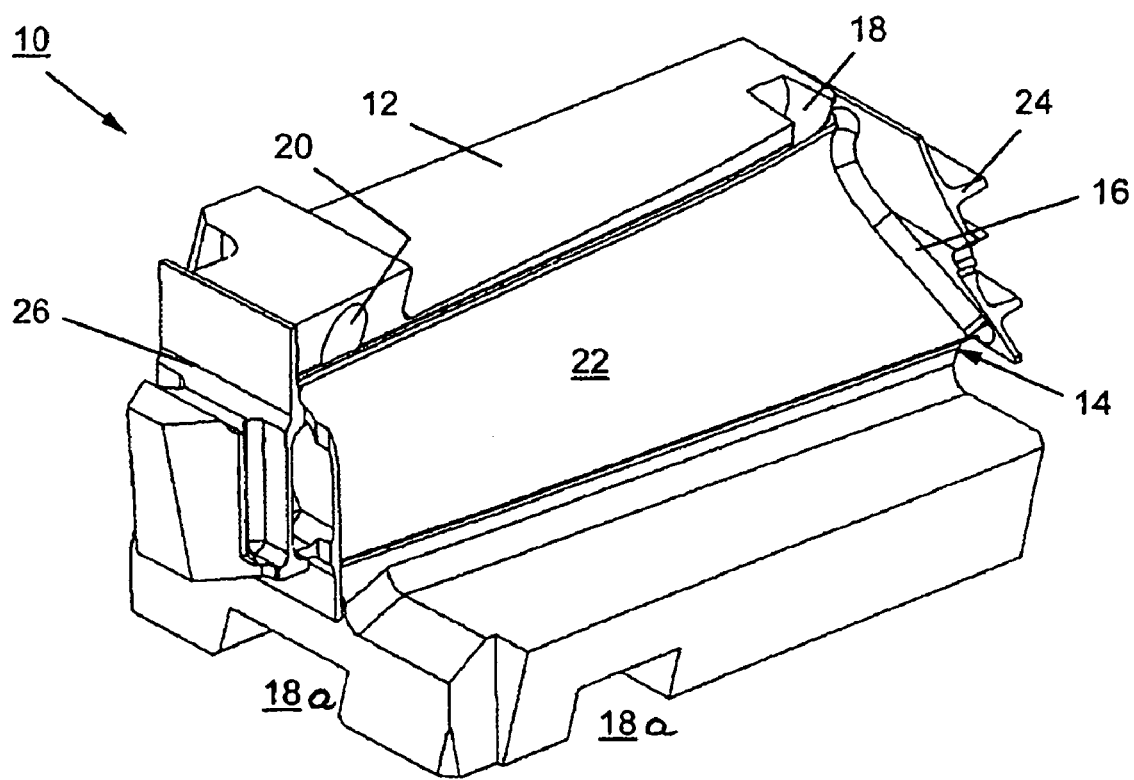
FIG. 4 shows another schematic diagram of the first application of the composite material according to the present invention as shown in FIG. 3, with the component inserted.

FIG. 4 shows a schematic diagram of component carrier 10 of the device with component 16 inserted, namely a turbine blade 16. Turbine blade 16 is a so-called rotor blade. It is apparent here that the turbine blade is made of a blade vane and/or subarea 22 and an outer shroud 24 and an inner shroud 26, shrouds 24, 26 being attached to the particular ends of blade vane 22. FIG. 4 shows clearly that blade vane 22 is inserted as a subarea of turbine blade 16 into the contour of component receptacle 14 and enters into a form-fitting and/or substance-to-substance bond using composite material 28. Composite material 28 may additionally be used as a filler for equalizing component tolerances and for bridging large adhesive gaps 40 (see also FIG. 5) at the bonded locations. Turbine blade 16 is held by adhesion during machining and also by form-fitting connection during machining, depending on how the force is applied during machining. The adhesive bond via composite material 28 is released mechanically, chemically or thermally after machining turbine blade 16. In addition, it is apparent here that a transfer of high machining forces without damaging turbine blade 16 or subareas thereof is possible due to the mounting of turbine blade 16 and/or blade vane 22 in component carrier 10 as shown here.

The exemplary embodiment here shows clearly that the application according to the present invention and component carrier 10 are suitable for production as well as repair of components of a gas turbine.

Figure 5:
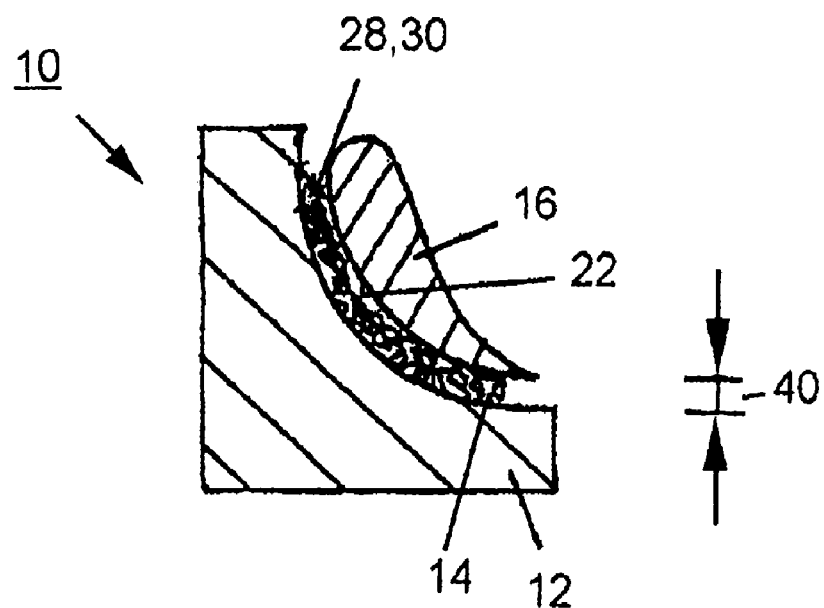
FIG. 5 shows a sectional diagram of a component carrier with the component.

FIG. 5 shows a sectional diagram of component carrier 10 having turbine blade 16 mounted on it. It is apparent here that the composite material is applied to component receptacle 14 and is in contact with subarea 22 of turbine blade 16 on its opposite surface. In addition, it may be seen here that composite material 28 completely fills adhesive gap 40 with fiber material 30 and thus allows a corresponding equalization of tolerance between component receptacle 14 and subarea 22 of turbine blade 16.

Figure 6:
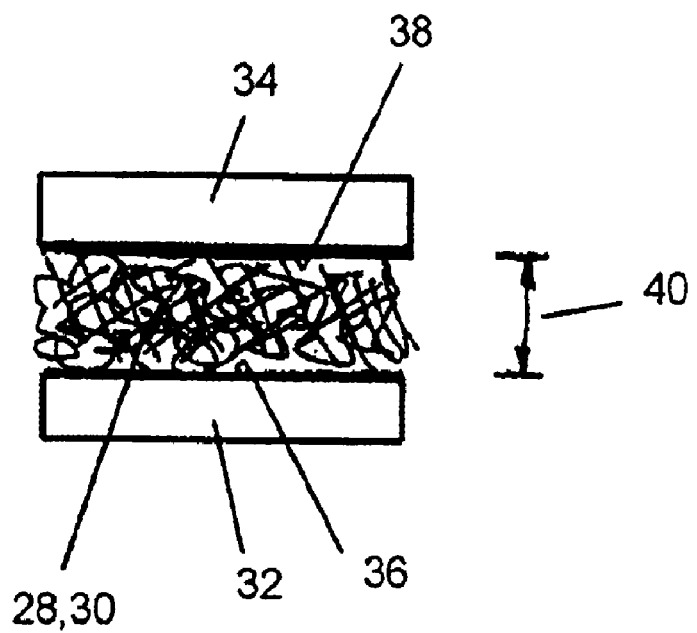
FIG. 6 shows a schematic diagram of a second application of the composite material according to the present invention.

FIG. 6 shows a schematic diagram of a second application of composite material 28, namely a joining of a first component 32 to a second component 34. Components 32, 34 are components of a gas turbine. It may be seen here that composite material 28 completely fills adhesive gap 40 between a first joining surface 36 of first component 32 and second joining surface 38 of second component 34 with fiber material 30 and thus in turn allows an equalization of tolerance between two components 32, 34 and/or joining surfaces 36, 38. Furthermore, the filling of adhesive gap 40 increases the adhesive strength between first and second components 32, 34.

List of Reference Numerals 10 component carrier
12 component body of 10
14 component receptacle in 12
16 component to be machined, i.e., turbine blade
18 recesses in 10
18a recesses in 10
20 engagement
22 subarea and/or blade vane of 16
24 outer shroud of 16
26 inner shroud of 16
28 composite material
30 woven or nonwoven fiber material of 28
32 first component
34 second component
36 first joining surface of 32
38 second joining surface of 34
40 adhesive gap between 36 and 38

What is claimed is:

1. A method for machining components of a gas turbine comprising:
providing at least one component carrier having at least one component receptacle for detachable accommodation and fastening of a component that is to be machined, the component receptacle having a contour resembling at least one contour of a subarea of the component to be accommodated;
introducing the at least one subarea of the component into the component receptacle by form-fitting and/or substance-to-substance bonding of the subarea of the component to the component receptacle, the form-fitting and/or substance-to-substance bonding being performed by adhesively bonding the subarea to the component receptacle;
machining the component joined to the component carrier; and
releasing the machined component from the component carrier.

2. The method as recited in claim 1, wherein the components is a turbine blades.

3. The method as recited in claim 1, wherein prior to said introducing step, at least the areas of the subarea which are to be accommodated in the component receptacle are sheathed by recasting or extrusion coating and said introducing step includes inserting this subarea of the component into the component receptacle.

4. The method as recited in claim 3, wherein the material for the sheathing by recasting or extrusion coating is a metal alloy, a thermoplastic and/or a hot-melt adhesive composition.

5. The method as recited in claim 1, wherein the step of releasing the machined component from the component carrier is performed chemically, thermally or mechanically.

6. The method as recited in claim 1, wherein prior to the step of machining the component joined to the component carrier, the exact location and position of the component are determined within and/or relative to the component carrier.

7. The method as recited in claim 6, wherein the location and position are determined by visual and/or tactile and/or ultrasound methods.

8. The method as recited in claim 1, wherein the at least one component carrier has at least one identification device.

9. The method as recited in claim 8, wherein the at least one identification device includes at least one RFID tag.

10. The method as recited in claim 1, wherein the step of machining the component joined to the component carrier includes multiple machining steps on multiple machining stations.

11. The method as recited in claim 1, wherein the step of machining the component joined to the component carrier includes grinding and deburring and/or coating of at least one subarea of the component.

12. A method for using a composite material for machining a component of a gas turbine comprising:
providing at least one component carrier having at least one component receptacle for detachable accommodation and fastening of the component that is to be machined, designing the component receptacle to have a contour resembling at least one contour of a subarea of the component to be accommodated;
applying the composite material to the component receptacle and introducing the at least one subarea of the component into the component receptacle and form-fitting and/or integral bonding of the subarea of the component to the component receptacle;
machining the component joined to the component carrier; and
releasing the machined component from the component carrier, wherein the step of applying the composite material to the component receptacle and/or the step of releasing the machined component from the component carrier is accomplished chemically, thermally or mechanically; wherein prior to said introducing step, at least the areas of the subarea which are to be accommodated in the component receptacle are sheathed by recasting or extrusion coating and said introducing step includes inserting this subarea of the component into the component receptacle.

13. The method as recited in claim 12, wherein the component is a turbine blade.

14. The method as recited in claim 12, wherein a material used in the step of sheathing by recasting or extrusion coating is one or more of a metal alloy, a thermoplastic and a hot-melt adhesive composition.

15. The method as recited in claim 12, wherein prior to the step of machining the component joined to the component carrier, determining the exact location and position of the component within and/or relative to the component carrier.

16. The method as recited in claim 12, wherein the step of machining the component joined to the component carrier comprises multiple machining steps at multiple machining stations.

17. The method as recited in claim 12, wherein the step of machining the component joined to the component carrier includes grinding and/or deburring and/or coating of at least a subarea of the component.

18. The method as recited in claim 12, wherein the step of applying the composite material to the component receptacle includes compressing the composite material.

19. A method for machining a component of a gas turbine comprising:
 providing at least one component carrier having at least one component receptacle for detachable accommodation and fastening of the component that is to be machined, the component receptacle having a contour resembling at least one contour of a subarea of the component to be accommodated, the subarea including a first surface of the component, the component having a second surface opposite the first surface;
 introducing the at least one subarea of the component into the component receptacle by form-fitting and/or substance-to-substance bonding of the subarea of the component to the component receptacle so that the first surface faces the component receptable and the second surface can remain uncontacted;
 machining the component joined to the component carrier; and
 releasing the machined component from the component carrier; wherein prior to said introducing step, at least the areas of the subarea which are to be accommodated in the component receptacle are sheathed by recasting or extrusion coating and said introducing step includes inserting this subarea of the component into the component receptacle.

20. The method as recited in claim 19, wherein the component is a turbine blade.

21. The method as recited in claim 19, wherein the material for the sheathing by recasting or extrusion coating is a metal alloy, a thermoplastic and/or a hot-melt adhesive composition.

22. The method as recited in claim 19, wherein the step of releasing the machined component from the component carrier is performed chemically, thermally or mechanically.

23. The method as recited in claim 19, wherein prior to the step of machining the component joined to the component carrier, the exact location and position of the component are determined within and/or relative to the component carrier.

24. The method as recited in claim 23, wherein the location and position are determined by visual and/or tactile and/or ultrasound methods.

25. The method as recited in claim 19, wherein the at least one component carrier has at least one identification device.

26. The method as recited in claim 25, wherein the at least one identification device includes at least one RFID tag.

27. The method as recited in claim 19, wherein the step of machining the component joined to the component carrier includes multiple machining steps on multiple machining stations.

28. The method as recited in claim 19, wherein the step of machining the component joined to the component carrier includes grinding and deburring and/or coating of at least one subarea of the component.

29. A method for machining a component of a gas turbine comprising:
 providing at least one component carrier having at least one component receptacle for detachable accommodation and fastening of the component that is to be machined, the component receptacle having a contour resembling at least one contour of a subarea of the component to be accommodated, the subarea including a first surface of the component, the component having a second surface opposite the first surface;
 introducing the at least one subarea of the component into the component receptacle by form-fitting and/or substance-to-substance bonding of the subarea of the component to the component receptacle so that the first surface faces the component receptable and the second surface can remain uncontacted;
 machining the component joined to the component carrier; and
 releasing the machined component from the component carrier; wherein the form-fitting and/or substance-to-substance bonding being performed by adhesively bonding the subarea to the component receptacle.

* * * * *